US008570549B2

(12) United States Patent
Yamamoto

(10) Patent No.: US 8,570,549 B2
(45) Date of Patent: Oct. 29, 2013

(54) IMAGE RECORDING APPARATUS IN WHICH A RECORDED CONTENT OR OUTPUT FOR WHICH THE CONFIDENTIALITY IS REQUIRED CAN BE PREVENTED FROM BEING VISIBLE TO ANOTHER USER

(75) Inventor: Shunsuke Yamamoto, Okazaki (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 104 days.

(21) Appl. No.: 13/050,319

(22) Filed: Mar. 17, 2011

(65) Prior Publication Data
US 2012/0075657 A1 Mar. 29, 2012

(30) Foreign Application Priority Data

Sep. 29, 2010 (JP) ................................. 2010-219722

(51) Int. Cl.
G06K 15/00 (2006.01)
H04N 1/60 (2006.01)
B41C 1/00 (2006.01)
G03G 15/02 (2006.01)
G03G 15/00 (2006.01)
G03G 21/00 (2006.01)

(52) U.S. Cl.
USPC ......... 358/1.14; 358/1.16; 358/1.9; 358/3.32; 399/31; 399/80; 399/366; 399/369

(58) Field of Classification Search
USPC ............ 358/1.14, 1.15, 1.16, 1.13, 1.17, 404, 358/444, 468, 407, 540, 3.32, 501, 426.02, 358/1.9, 524, 514, 525; 726/5, 17, 26, 27; 713/183, 200, 152, 161, 164, 165, 166, 713/167, 169, 182, 300; 399/405, 31, 38, 399/75, 76, 80, 79, 81, 82, 84, 88, 268, 273, 399/361, 366, 369, 372, 377
See application file for complete search history.

(56) References Cited

U.S. PATENT DOCUMENTS

2005/0010809 A1* 1/2005 Hayano ......................... 713/200
2008/0193182 A1* 8/2008 Sasama ......................... 399/405

FOREIGN PATENT DOCUMENTS

JP 06-124178 A 5/1994
JP H11-028850 A 2/1999

(Continued)

OTHER PUBLICATIONS

Naoki, Image Forming Apparatus and Control Method of Image Information Apparatus, Jan. 10, 2009, Machine Translated Japanese Patent Application publication, JP2009220525, all pages.*

(Continued)

Primary Examiner — Ngon Nguyen
(74) Attorney, Agent, or Firm — Scully, Scott, Murphy & Presser, P.C.

(57) ABSTRACT

An image recording apparatus, including: a recording device; discharge trays; a discharge mechanism; detectors; an input device through which is inputted authentication information relating to image data; and a controller including: an image-data reception portion; an authentication-information confirming portion to make a confirmation as to whether the authentication information contains specific information; a confirmation-necessity judging portion to judge whether the confirmation by the confirming portion with respect to the image data is necessary; a selecting portion to select one discharge tray on which the recording medium is not placed, wherein, where the judging portion judges that the confirmation is necessary, the controller permits selection of the one discharge tray, controls the recording device to record the image based on the image data after the confirmation that the authentication information contains the specific information, and controls the discharge mechanism to discharge, to the selected one discharge tray, the image-recorded recording medium.

8 Claims, 5 Drawing Sheets

(56) References Cited

FOREIGN PATENT DOCUMENTS

| JP | 2002-234234 A | 8/2002 |
| JP | 2007-152798 A | 6/2007 |
| JP | 2009-220525 A | 10/2009 |

OTHER PUBLICATIONS

Notification of Reason(s) for Refusal dated Jun. 12, 2012 from the Japanese Patent Office from related Japanese Application No. 2010-219722, together with an English-language translation.

* cited by examiner

IMAGE RECORDING APPARATUS IN WHICH A RECORDED CONTENT OR OUTPUT FOR WHICH THE CONFIDENTIALITY IS REQUIRED CAN BE PREVENTED FROM BEING VISIBLE TO ANOTHER USER

CROSS REFERENCE TO RELATED APPLICATION

The present application claims priority from Japanese Patent Application No. 2010-219722,which was filed on Sep. 29, 2010, the disclosure of which is herein incorporated by reference in its entirety.

BACKGROUND OF THE INVENTION

1. Field of the Invention

The present invention relates to an image recording apparatus configured to record an image on a recording medium.

2. Discussion of Related Art

There is known a technique in which image data of an image to be printed is sent by a user from a user terminal to a printer and printing of the image based on the image data is executed after the user has completed authentication procedure in the printer, for the purpose of enhancing security of a printout or print output to be obtained.

SUMMARY OF THE INVENTION

According to the technique described above, the printing is initiated in the presence of the user who has conducted the authentication procedure, so that the confidentiality of the printout or print output obtained by the printing can be enhanced. However, in an instance where another user comes to the printer, in the midst of that printing in question, for taking another printout obtained by already completed another printing, the content that is being printed may be visible or observable to another user.

It is therefore an object of the invention to provide an image recoding apparatus in which a recorded content or output for which the confidentiality is required can be prevented from being visible to another user.

The above-indicated object may be attained according to a principle of the invention, which provides an image recording apparatus, comprising:

a recording device configured to perform recording of an image on a recording medium;

a plurality of discharge trays to which is discharged the recording medium on which the image has been recorded by the recording device;

a discharge mechanism configured to discharge, to any of the plurality of discharge trays, the recording medium on which the image has been recorded by the recording device;

a plurality of detectors which are provided for the respective discharge trays for detecting presence and absence of the recording medium discharged on the respective discharge trays;

an input device through which is inputted authentication information in relation to image data which is transmitted from an exterior and on the basis of which the image is recorded by the recording device; and a controller which is configured to control operations of the image recording apparatus and which includes: a reception portion configured to receive the image data; an authentication-information confirming portion configured to make a confirmation as to whether or not the authentication information inputted through the input device contains specific information; a confirmation-necessity judging portion configured to make a judgment, when the reception portion receives the image data, as to whether the confirmation by the authentication-information confirming portion with respect to the image data is necessary or not; a selecting portion configured to select, from among the plurality of discharge trays, one discharge tray on which the recording medium is not placed, wherein, where the confirmation-necessity judging portion makes a judgment that the confirmation by the authentication-information confirming portion with respect to the image data is necessary, the controller permits the selecting portion to select the one discharge tray, controls the recording device to record the image based on the image data after the authentication-information confirming portion has made a confirmation that the authentication information contains the specific information, and controls the discharge mechanism to discharge, to the one discharge tray selected by the selecting portion, the recording medium on which the image based on the image data has been recorded, and wherein, where the confirmation-necessity judging portion makes a judgment that the confirmation by the authentication-information confirming portion with respect to the image data is not necessary, the controller controls the recording device to record the image based on the image data on the recording medium and controls the discharge mechanism to discharge, to any one of the discharge trays, the recording medium on which the image based on the image data has been recorded.

BRIEF DESCRIPTION OF THE DRAWINGS

The above and other objects, features, advantages and technical and industrial significance of the present invention will be better understood by reading the following detailed description of embodiments of the invention, when considered in connection with the accompanying drawings, in which.

DETAILED DESCRIPTION OF THE EMBODIMENTS

There will be described one embodiment of the invention with reference to the drawings.

Figure 1:
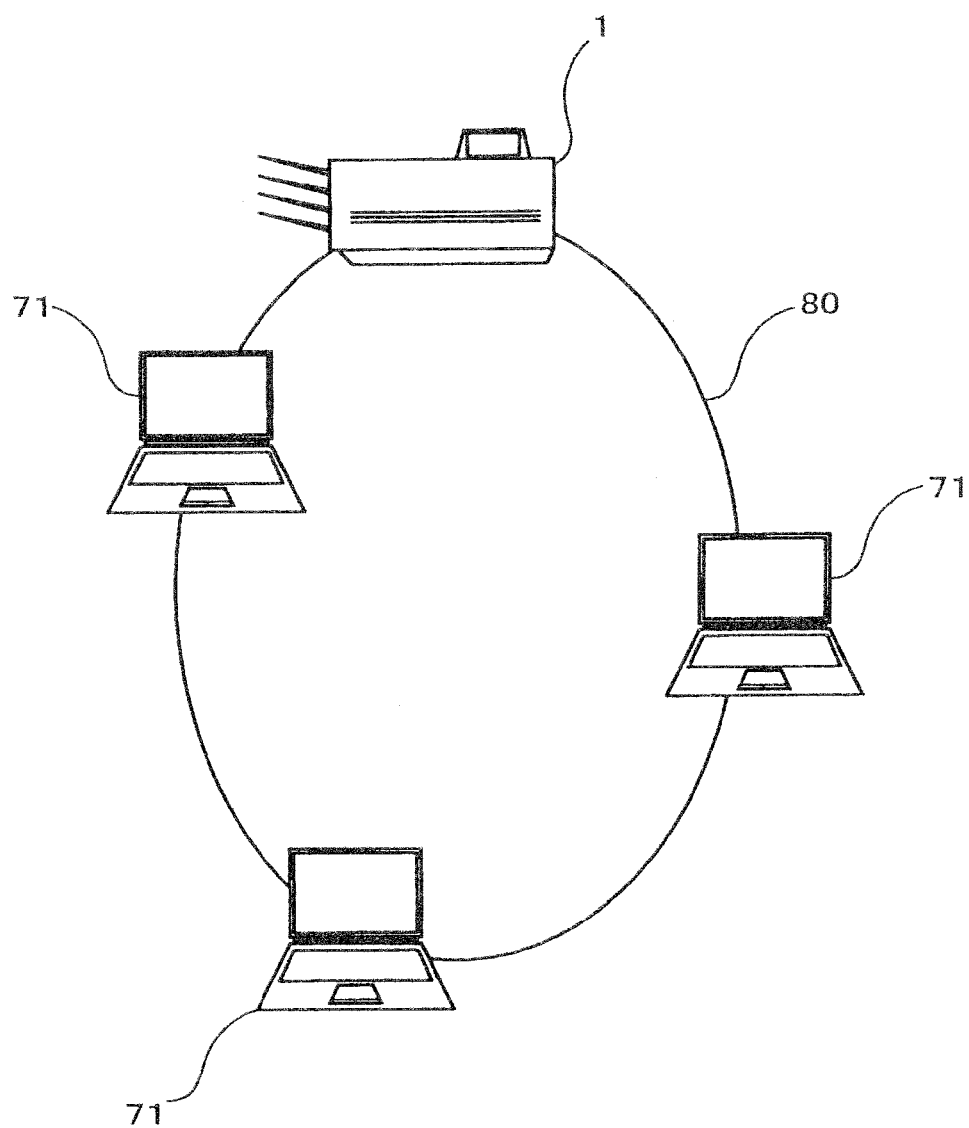
FIG. 1 is a view showing a network including an ink-jet printer according to one embodiment of the invention.

As shown in FIG. 1, an ink-jet printer 1 as an image recording apparatus according to one embodiment of the invention is a shared printer connected to a Local Area Network (LAN) 80 to which a plurality of client terminals 71 are connected. Each of users can send a print command from a corresponding one of the client terminals 71 to the ink-jet printer 1 through the LAN 80.

Figure 2:
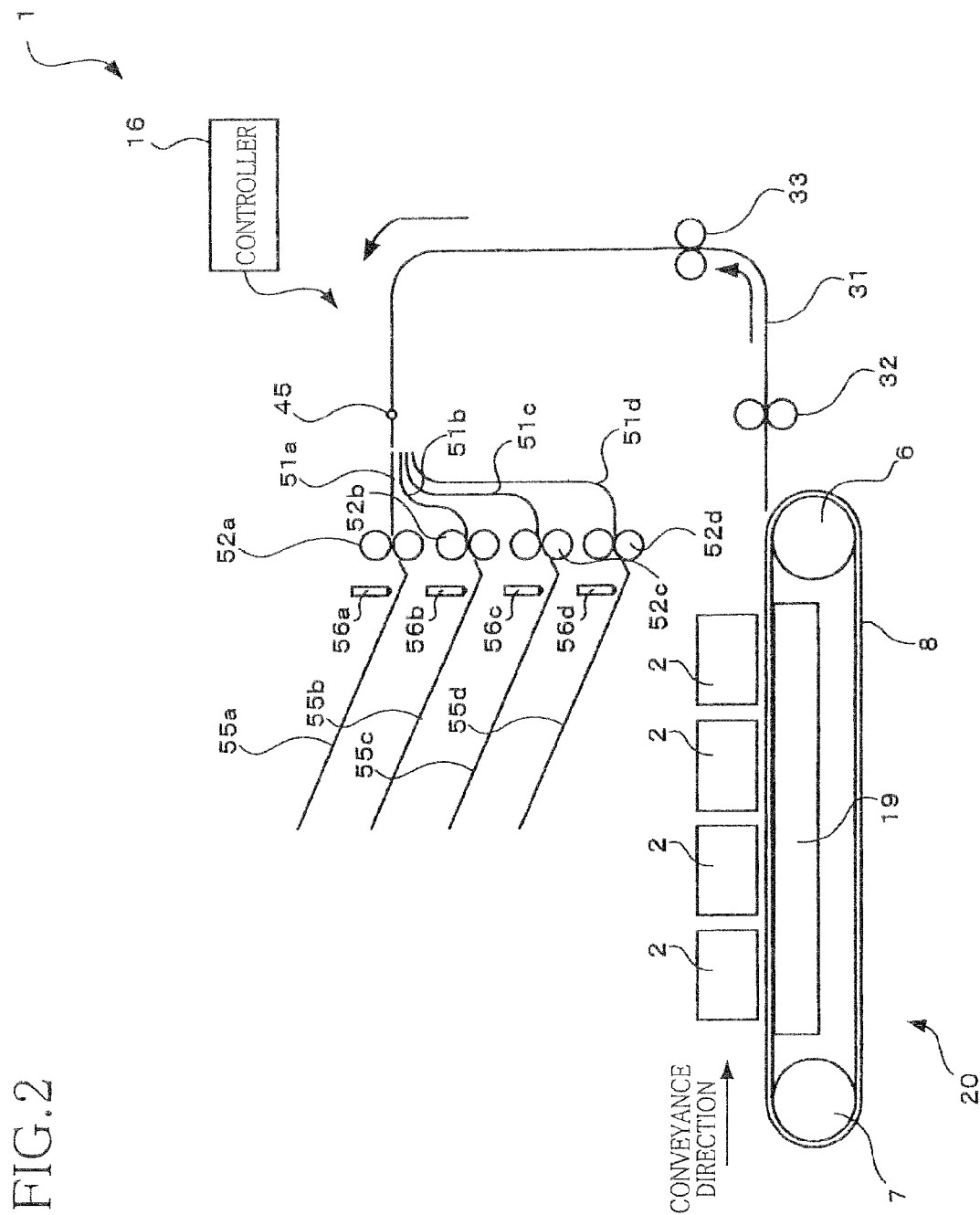
FIG. 2 is a side view schematically showing the ink-jet printer shown in FIG. 1.

As shown in FIG. 2, the ink-jet printer 1 includes: a conveyor mechanism 20; four ink-jet heads 2, as a recording device, for ejecting droplets of a black ink, a magenta ink, a cyan ink, and a yellow ink, respectively, to a sheet P as a recording medium conveyed by the conveyor mechanism 20; a guide 31; nip roller pairs 32, 33; a discharge mechanism 45; four discharge trays 55*a*-55*d;* and a controller 16. In the present embodiment, a sub scanning direction is a direction which is horizontal and which is parallel to a conveyance direction (indicated by an arrow in FIG. 2) in which the sheet P is conveyed by the conveyor mechanism 20. A main scanning direction is a direction orthogonal to the sub scanning direction and along the horizontal plane.

The conveyor mechanism 20 includes: two belt rollers 6, 7; an endless conveyor belt 8 wound around and stretched between the two rollers 6, 7; and a platen 19 disposed within a loop of the conveyor belt 8 so as to be opposed to the four ink-jet heads 2. The belt roller 6 is a drive roller and is configured to be rotated by a drive force given from a conveyance motor (not shown). The belt roller 7 is a driven roller and is configured to be rotated by the movement of the conveyor belt 8 in accordance with the rotation of the belt roller 6. The sheet P placed on the outer surface of the conveyor belt 8 is conveyed in the conveyance direction indicated by the arrow in FIG. 2, namely, rightward in FIG. 2.

Each of the four ink-jet heads 2 extends in the main scanning direction. The four ink-jet heads 2 are arranged in parallel with each other in the sub scanning direction. That is, the ink-jet printer 1 is a color ink-jet printer of a line type in which a plurality of ejection openings for ejecting ink droplets are arranged in the main scanning direction. The lower surface of each ink-jet head 2 is formed as an ejection surface in which the plurality of ejection openings for ejecting the ink droplets are open.

The platen 19 supports the conveyor belt 8 from the inside of the loop of the conveyor belt 8. Accordingly, the outer surface of the upper portion of the loop of the conveyor belt 8 and the ejection surfaces of the ink-jet heads 2 are opposed to each other and are parallel with each other. Further, a clearance suitable for image formation is formed between the outer surface of the conveyor belt 8 and the ejection surfaces of the ink-jet heads 2. When the sheet P conveyed by the conveyor belt 8 passes right below the four ink-jet heads 2, the ink droplets of the mutually different colors are ejected, in order, from the respective ink-jet heads 2 to the upper surface of the sheet P, so that an intended color image is formed on the sheet P. The sheet P on which the image has been formed is further conveyed rightward in FIG. 2 by the conveyor mechanism 20 and reaches the guide 31.

The guide 31 is configured to guide, to the discharge mechanism 45, the image-recorded sheet P that is being conveyed by the conveyor mechanism 20. The nip roller pairs 32, 33 drive the sheet P that is being guided by the guide 31 while holding the sheet P between the rollers of each pair, so as to give a conveyance force to the sheet P, whereby the sheet P is turned along the guide 31 and is conveyed leftward in FIG. 2.

The discharge mechanism 45 connects the guide 31 to any one of four guides 51a-51d which respectively correspond to the four discharge trays 55a-55d. The sheet P that has been conveyed while being guided by the guide 31 is inserted to one of the four guides 51a-51d that is connected to the guide 31 by the discharge mechanism 45 and is further conveyed leftward in FIG. 2 by a corresponding one of nip roller pairs 52a-52d.

The four discharge trays 55a-55d are arranged in the vertical direction. The sheet P that has been conveyed while being guided by the one of the four guides 51a-51d is discharged to a corresponding one of the discharge trays 55a-55d. In this instance, the sheet P is discharged so as to be stacked on another sheet P that has been previously discharged.

Sheet sensors 56a-56d are disposed at respective positions such that each sensor 56a-56d is opposed to a corresponding one of the four discharge trays 55a-55d. Each of the sheet sensors 56a-56d is configured to detect whether or not a printed sheet P exists on a corresponding one of the four discharge trays 55a-55d.

The ink-jet printer 1 further includes an operation panel 42 (FIG. 3) on which a touch panel display is disposed.

Figure 3:
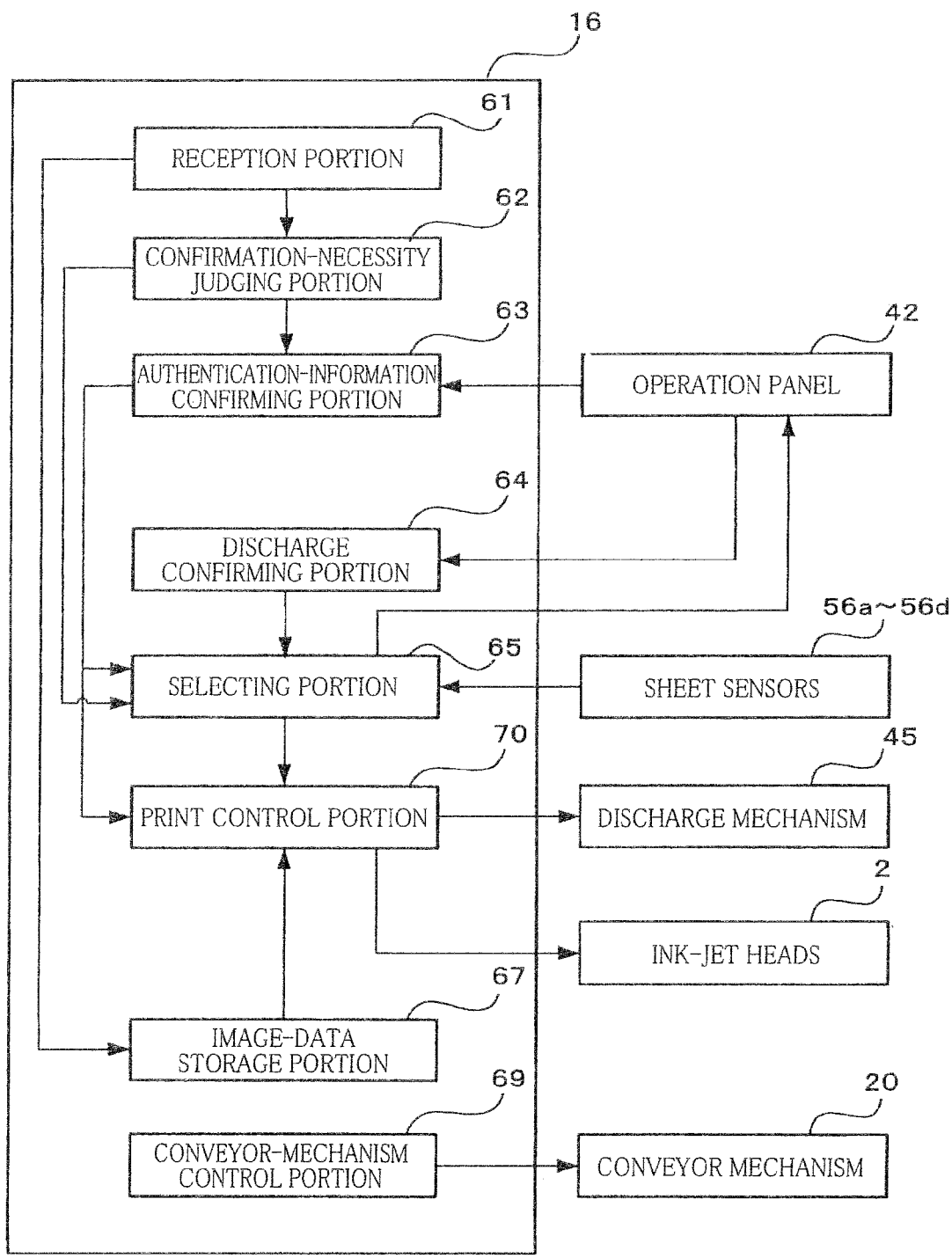
FIG. 3 is a functional block diagram of a controller shown in FIG. 2.

Referring next to FIG. 3, the controller 16 will be explained. The controller 16 includes a Central Processing Unit (CPU), an Electrically Erasable and Programmable Read Only Memory (EEPROM) which stores programs to be executed by the CPU and which rewritably stores data to be utilized in the programs, and a Random Access Memory (RAM) which temporarily stores data when the programs are executed. Various functional portions that constitute the controller 16 are realized by cooperation of hardware described above and software in the EEPROM. As shown in FIG. 3, the controller 16 includes a reception portion 61, a confirmation-necessity judging portion 62, an authentication-information confirming portion 63, a discharge confirming portion 64, a selecting portion 65, an image-data storage portion 67, a conveyor-mechanism control portion 69, and a print control portion 70.

The reception portion 61 is configured to receive a print command from each client terminal 71 through the LAN 80. The print command includes data indicative of a print mode and image data on the basis of which an image is to be printed on the sheet P. The print mode includes two modes, namely, secure printing and normal printing. The secure printing is a printing operation in which, when a user sends a print command to the ink-jet printer 1 from the corresponding client terminal 71, printing based on that print command is not started until the user inputs authentication information to the ink-jet printer 1. Thus, in the secure printing, the printing is started under monitoring by the user, so that security of the printout or print output obtained by the secure printing is high. On the other hand, the normal printing is a printing operation in which, when the ink-jet printer 1 receives a print command from one client terminal 71, printing based on that print command is immediately started.

The image-data storage portion 67 is configured to store the image data contained in the print command received by the reception portion 61.

The confirmation-necessity judging portion 62 is configured to judge to which one of the secure printing and the normal printing the print command received by the reception portion 61 is related. In general, the judgment is made on the basis of the format of identification data and the image data contained in the print command.

The authentication-information confirming portion 63 is configured to confirm whether or not authentication information inputted by the user through the operation panel 42 in the secure printing contains specific information. Here, the specific information refers to matching with a password contained in the print command and matching with user information stored in the printer, for instance. The authentication information may be inputted by the user through the operation panel 42 as described above. Alternatively, the authentication information may be inputted such that the authentication information stored in a card or the like is read by a reading device connected to the ink-jet printer 1.

The selecting portion 65 is configured to judge, on the basis of detection results by the respective sheet sensors 56a-56d, whether or not there exist any discharge tray on which a discharged sheet P is not placed among three discharge trays 55b-55d except the uppermost discharge tray 55a, where the confirmation-necessity judging portion 62 judges that the print command received by the reception portion 61 is related to the secure printing, namely, where the confirmation-necessity judging portion 62 makes a judgment that the confirmation of the authentication information by the authentication-information confirming portion 63 is necessary. Where it is judged that there exist discharge tray or trays, among the three discharge trays 55b-55d, on which the discharged sheet P is not placed, the selecting portion 65 selects an uppermost one of the discharge trays 55b-55d on which the discharged sheet P is not placed and displays the result of selection on the operation panel 42.

On the other hand, where it is judged that there exist no discharge trays on which the discharged sheet P is not placed, the selecting portion 65 obtains, from a discharge confirming portion 64 (which will be explained), a result of confirmation by a user as to whether the sheet P may be forcibly discharged to any one of the uppermost discharge tray 55a and the other three discharge trays 55b-55d on each of which the discharged sheet P is placed. Where the selecting portion 65 obtains a confirmation result to the effect that the sheet P may be forcibly discharged to any one of the discharge trays 55a-55d, the selecting portion 65 selects one of the discharge trays 55a-55d that corresponds to the confirmation result. On the other hand, where the selecting portion 65 obtains a confirmation result to the effect that the sheet P is discharged to none of the discharged trays 55a-55d, the selecting portion 65 continues to monitor the detection results of the sheet sensors 56a-56d and stands by until any one of the discharge trays 55a-55d becomes a state in which the discharged sheet P is not present thereon after having been removed therefrom.

Further, the selecting portion 65 cancels selection of the selected one of the three discharge trays 55b-55d where one of the sheet sensors 56a-56d that corresponds to the selected one discharge tray detects that the discharged sheet P on the selected discharge tray is removed therefrom by the user after having been discharged, namely, detects absence of the discharged sheet P on the selected discharge tray.

The discharge confirming portion 64 is configured to display a confirmation screen for inquiring the user as to whether the sheet P may be forcibly discharged to any one of the discharge trays 55a-55d where the authentication information is inputted by the user through the operation panel 42 after the selecting portion 65 has judged that there exist no discharge trays 55b-55d on each of which the discharged sheet P is not placed. Further, the discharge confirming portion 64 stores the confirmation result obtained as a result of a user's operation of the operation panel 42.

The image-data storage portion 67 is configured to store the image data contained in the print command received by the reception portion 61.

The conveyor-mechanism control portion 69 is configured to control the conveyor mechanism 20 such that the sheet P is conveyed at a prescribed conveyance speed.

The print control portion 70 is configured to control the selecting portion 65, the discharge mechanism 45, and the ink-jet heads 2 such that the secure printing is conducted where the confirmation-necessity judging portion 62 judges that the print command received by the reception portion 61 is related to the secure printing and such that the normal printing is conducted where the confirmation-necessity judging portion 62 judges that the print command received by the reception portion 61 is not related to the secure printing.

Where the secure printing is conducted, the print control portion 70 permits the selecting portion 65 to select one of the three discharge trays 55b-55d and controls the ink-jet heads 2 to record, on the sheet P, an image based on image data that relates to the secure printing after the authentication-information confirming portion 63 has confirmed that the authentication information inputted by the user contains the specific information, and further controls the discharge mechanism 45 such that the sheet P is discharged to the one of the three discharge trays 55b-55d selected by the selecting portion 65.

Where the normal printing is conducted, the print control portion 70 controls the ink-jet heads 2 to record, on the sheet P, an image based on image data that relates to the normal printing and controls the discharge mechanism 45 such that the sheet P is discharged to any one of the discharge trays 55a-55d. In this instance, where the selection of the selected one of the three discharge trays 55b-55d by the selecting portion 65 is not cancelled yet, the print control portion 70 controls the ink-jet heads 2 not to record the image on the sheet P.

The print control portion 70 is configured to convert the image data stored in the image-data storage portion 67 into drive data for driving the ink-jet heads 2 and to transmit the converted drive data to the ink-jet heads 2, thereby controlling ejection of the ink droplets by the ink-jet heads 2. In this respect, where the image data stored in the image-data storage portion 67 is in the same format as the drive data, the image data is transmitted to the ink-jet heads 2 without being converted.

In the secure printing, the print control portion 70 converts the image data into the drive data and transmits the drive data to the ink-jet heads 2 after completion of the confirmation by the authentication-information confirming portion 63. In the normal printing, the print control portion 70 converts the image data into the drive data and transmits the drive data to the ink-jet heads 2. Further, the print control portion 70 is configured to stop transmission of the drive data where it is necessary to stop printing because the selection of the selected one of the discharge trays 55b-55d by the selecting portion 65 is not cancelled.

Figure 4:
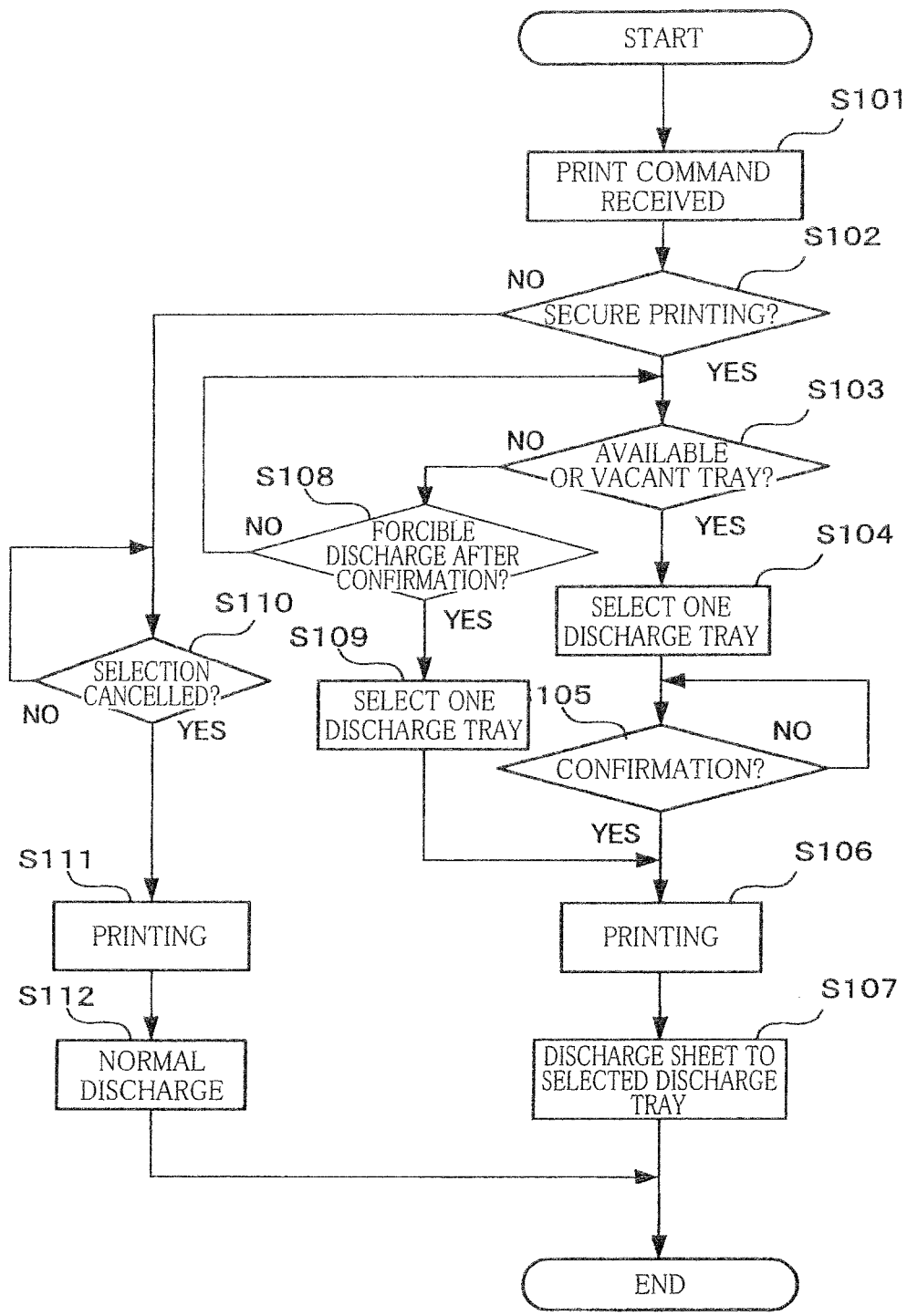
FIG. 4 is a flow chart showing a printing operation of the ink-jet printer shown in FIG. 1.

Referring next to the flow chart of FIG. 4, the printing operation by the ink-jet printer 1 will be explained. As shown in FIG. 4, when a print command is transmitted from one client terminal 71, the reception portion 61 receives the print command (S101). In this instance, image data in relation to the print command is stored in the image-data storage portion 67. Subsequently, the confirmation-necessity judging portion 62 judges to which one of the secure printing and the normal printing the print command is related (S102). Where the print command received by the reception portion 61 is related to the secure printing (S102: YES), the selecting portion 65 judges, on the basis of detection results by the respective sheet sensors 56a-56d, whether there exist available or vacant tray or trays, among the three discharge trays 55b-55d, on which a discharged sheet P is not placed (S103). Where there exist available tray or trays (S103: YES), the selecting portion 65 selects an uppermost one of the available tray or trays (S104) and displays the selection result on the operation panel 42.

Subsequently, the authentication-information confirming portion 63 makes a confirmation, when the authentication information is inputted by the user through the operation panel 42, as to whether or not the inputted authentication information contains the specific information (S105). Where the inputted authentication information does not contain the specific information (S105: NO), the authentication-information confirming portion 63 stands by until the authentication information containing the specific information is inputted by the user through the operation panel 42, in other words, inputting of the authentication information containing the specific information by the user through the operation panel 42 is awaited. Where the inputted authentication information contains the specific information (S105: YES), the print control portion 70 controls the ink-jet heads 2 to print, on the sheet P, an image based on the image data relating to the print command (S106) and controls the discharge mechanism 45 such that the sheet P on which the image based on the image data has been printed is discharged to the one of the three discharge trays 55b-55d selected by the selecting portion 65 (S107). Thus, the secure printing is ended.

On the other hand, where there exist no available or vacant trays on which the discharged sheet P is not placed (S103: NO), the discharge confirming portion 64 displays, on the operation panel 42, a confirmation screen for inquiring the user as to whether the sheet P may be forcibly discharged to any one of the discharge trays 55a-55d when the authentication information is inputted by the user through the operation panel 42. Subsequently, the selecting portion 65 obtains, from the discharge confirming portion 64, a result of confirmation by the user as to whether the sheet P is forcibly discharged to any one of the discharge trays 55a-55d and judges, on the basis of the confirmation result, whether or not the forcible discharge is conducted (S108). Where the forcible discharge is not conducted (S108: NO), the selecting portion 65 stands by until any of the discharge trays 55a-55d becomes available or vacant. Where the forcible discharge is conducted (S108: YES), the selecting portion 65 selects any one of the discharge trays 55a-55d that corresponds to the confirmation result (S109). Subsequently, the print control portion 70 controls the ink-jet heads 2 to print, on the sheet P, the image based on the image data that relates to the print command (S106) and further controls the discharge mechanism 45 such that the sheet P on which the image based on the image data has been printed is discharged to one of the discharge trays 55a-55d selected by the selecting portion 65 (S107). Thus, the secure printing is ended.

On the other hand, where the print command received by the reception portion 61 is related to the normal printing (S102: NO), it is judged whether the selection of the one of the discharge trays 55b-55d selected by the selecting portion 65 is already canceled or not (S110). Where the selection is not yet cancelled (S110: NO), cancellation of the selection is awaited. Where the selection is already cancelled (S110: YES), the print control portion 70 controls the ink-jet heads 2 to print, on the sheet P, an image based on image data relating to the print command (S111) and controls the discharge mechanism 45 to conduct a normal discharge operation in which the sheet P on which the image based on the image data has been printed is discharged to any one of the discharge trays 55a-55d (S112). Thus, the normal printing is ended.

As described above, in the ink-jet printer 1 according to the present embodiment, the sheet P on which the image has been printed according to the secure printing is discharged to one of the discharge trays 55b-55d which is selected by the selecting portion 65 and on which no discharged sheets are placed. Accordingly, the sheet P on which the image has been printed according to the secure printing is prevented from being discharged on the already discharged sheet or sheets P. Therefore, the sheet P on which the image has been printed according to the secure printing does not mix, on the same one of the trays 55b-55d, with the already discharged sheet or sheets P. Thus, the printed content or output by the secure printing for which confidentiality is required can be restrained from being visible to another user who comes to the ink-jet printer 1 to take the already discharged sheet or sheets P. In other words, the sheet P on which the image based on the image data for which the confirmation of the authentication information is required has been printed is not discharged on another already discharged sheet or sheets P.

In the ink-jet printer 1 according to the present embodiment, the selecting portion 65 selects any one of the three discharge trays 55b-55d except the uppermost discharge tray 55a, so that the sheet P on which the image has been printed according to the secure printing is not discharged to the uppermost tray 55a. Therefore, the printed content or output by the secure printing for which confidentiality is required can be restrained from being visible to another user who comes to the ink-jet printer 1 to take the already discharged sheet or sheets P.

In the ink-jet printer 1 according to the present embodiment, the print control portion 70 stands by without discharging the sheet P on which the image has been printed according to the normal printing, where the selection of the one of the discharge trays 55b-55d selected by the selecting portion 65 is not yet cancelled. Therefore, the printed content or output by the secure printing for which confidentiality is required can be restrained from being visible to another user who comes to the ink-jet printer 1 to take the already discharged sheet or sheets P.

Further, where the selection, by the selecting portion 65, of any one of the three discharge trays 55b-55d on which no discharged sheets are placed is impossible in the secure printing, the print control portion 70 permits the selecting portion 65 to stand by without conducting the selection until the selection becomes possible. Accordingly, where any one of the discharge trays 55b-55d becomes available by the time of completion of the confirmation of the authentication information, any one of the discharge trays 55b-55d is selected at a time point when becomes available and the printing can be immediately performed.

In a period during which the selecting portion 65 stands by without conducting the selection of one of the discharge trays 55b-55d as described above, the ink-jet heads 2 are controlled to stand by without executing the secure printing. Accordingly, the printed content or output by the secure printing for which confidentiality is required can be restrained from being visible to another user who comes to the ink-jet printer 1 to take the already discharged sheet or sheets P.

In the secure printing, where none of the discharge trays 55b-55d are available, namely, where there exist no discharge trays 55b-55d on which no discharged sheets P are placed, the confirmation screen is displayed on the operation panel 42 for inquiring the user as to whether the sheet P may be discharged to any one of the discharge trays 55a-55d. Accordingly, even where none of the discharge trays 55b-55d are available, the user can judge whether the printing is to be executed or not by considering the printing job amount and so on.

Further, where the confirmation-necessity judging portion 62 makes a judgment that the print command received by the reception portion 61 is related to the secure printing, the print control portion 70 converts the image data into the drive data and transmits the drive data to the ink-jet heads 2 after completion of the confirmation of the authentication information by the authentication-information confirming portion 63. According to the arrangement, since the conversion into the drive data has been finished before the confirmation by the authentication-information confirming portion 63, the printing of the image on the sheet P can be promptly performed after the completion of the confirmation of the authentication information.

In the ink-jet printer 1 according to the present embodiment, the selection result by the selecting portion 65 is displayed on the operation panel 42, whereby the user can promptly take the sheet P on which the image has been printed according to the secure printing.

21 Modified Embodiment>

Figure 5:
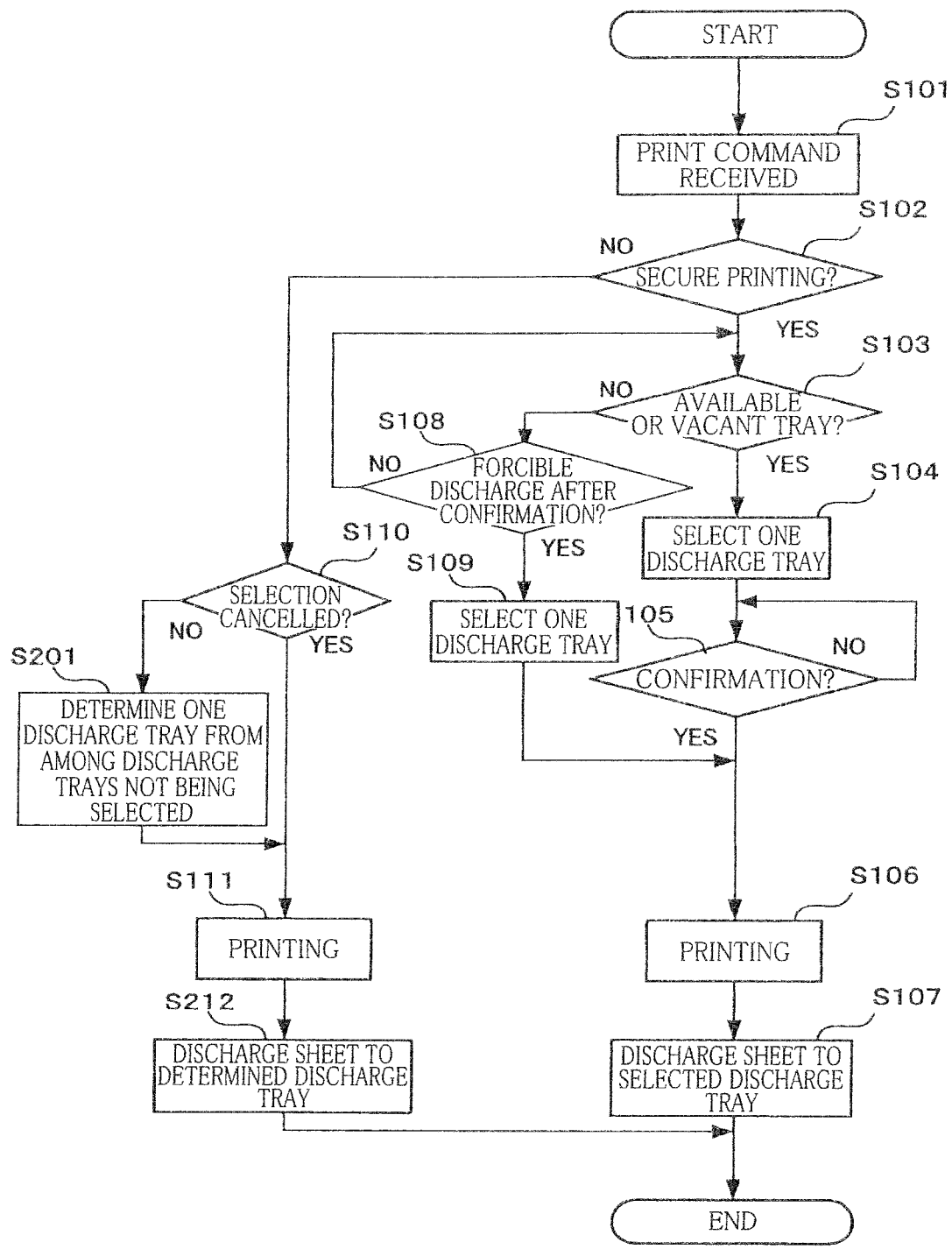
FIG. 5 is a flow chart showing a printing operation according to a modified embodiment.

In the illustrated embodiment, where the selection of the one of the discharge trays 55b-55d selected by the selecting portion 65 is not yet cancelled, the print control portion 70 controls the ink-jet heads 2 not to perform printing, on the sheet P, of the image according to the normal printing until the selection is cancelled. This arrangement may be modified as follows, for instance. As shown in FIG. 5, where the print command received by the reception portion 61 is related to the normal printing (S102: NO), it is judged whether or not the selection of the one of the discharge trays 55b-55d selected by the selecting portion 65 is already cancelled (S110). Where the selection is not yet cancelled (S110: NO), any one of the discharge trays 55a-55d that is not being selected by the selecting portion 65 may be determined as a discharge tray to which the sheet P relating to the print command is to be discharged (S201). Thereafter, the print control portion 70 controls the ink-jet heads 2 to print, on the sheet P, the image based on the image data that relates to the print command (S111) and further controls the discharge mechanism 45 to conduct a normal discharge operation in which the sheet P on which the image based on the image data has been printed is discharged to the determined one of the discharge trays 55a-55d (S212). In the arrangement, the normal printing can be continued while preventing the sheet P printed according to the secure printing and the sheet P printed according to the normal printing from being discharged to the same one of the discharge trays 55a-55d.

While the presently preferred embodiment and the modified embodiment of the invention have been described, it is to be understood that the invention is not limited to the details of the embodiments, but may be embodied with various changes and modifications without departing from the spirit and scope of the invention defined in the appended claims. In the illustrated embodiment, the selecting portion 65 selects one discharge tray to which the sheet P printed according to the secure printing is to be discharged, from among the three discharge trays 55b-55d except the uppermost discharge tray 55a. The selecting portion 65 may be configured to select the one discharge tray, from among all of the four discharge trays 55a-55d or to select the one discharge tray from among other combinations of the discharge trays 55a-55d. It is noted that the number of the discharge trays may be two, three, or five or more.

In the illustrated embodiment, where the selection, by the selecting portion 65, of any one of the discharge trays 55b-55d on which no discharged sheets P are placed is impossible in the secure printing, the print control portion 70 permits the selecting portion 65 to stand by without conducting the selection until the selection becomes possible. Where the selection is impossible, the print command may be cancelled or any one of the discharge trays 55a-55d may be forcibly selected.

In the illustrated embodiment, in the secure printing, where none of the discharge trays 55b-55d are available, namely, where there exist no discharge trays 55b-55d on which no discharged sheets P are placed, the confirmation screen is displayed on the operation panel 42 for inquiring the user as to whether the sheet P may be discharged to any one of the discharge trays 55a-55d. The inquiry may not be conducted.

In the illustrated embodiment, where the confirmation-necessity judging portion 62 makes a judgment that the print command received by the reception portion 61 is related to the secure printing, the print control portion 70 converts the image data into the drive data and transmits the drive data to the ink-jet heads 2 after completion of the confirmation of the authentication information by the authentication-information confirming portion 63. The print control portion 70 may be configured to convert the image data into the drive data and to transmit the drive data to the ink-jet heads 2, after completion of the confirmation by the authentication-information confirming portion 63.

In the illustrated embodiment, the selection result by the selecting portion 65 is displayed on the operation panel 42. The selection result may not be displayed.

The invention is applicable to a liquid ejecting apparatus configured to eject a liquid other than ink. The invention is applicable to a laser printer. Further, the invention is applicable to a facsimile machine or a copying machine, other than the printer.

What is claimed is:

1. An image recording apparatus, comprising:
a recording device configured to perform recording of an image on a recording medium;
a plurality of discharge trays to which is discharged the recording medium on which the image has been recorded by the recording device, each of the plurality of discharge trays configured to enable the discharged recording medium on which the image has been recorded to be freely removed;
a discharge mechanism configured to discharge, to any of the plurality of discharge trays, the recording medium on which the image has been recorded by the recording device;
a plurality of detectors, each of which is provided for a corresponding one of the plurality of discharge trays for detecting presence and absence of the recording medium discharged on the corresponding one of the plurality of discharge trays;
an input device through which is inputted authentication information in relation to image data which is transmitted from an exterior and based on which the image is recorded by the recording device; and
a controller which is configured to control operations of the image recording apparatus and which includes: a reception portion configured to receive the image data; an authentication-information confirming portion configured to confirm whether or not the authentication information inputted through the input device contains specific information; a confirmation-necessity judging portion configured to judge, when the reception portion receives the image data, whether the confirmation by the authentication-information confirming portion with respect to the image data is necessary or not; a selecting portion configured to select, from among the plurality of discharge trays, one discharge tray on which the recording medium is not placed,
wherein, when the confirmation-necessity judging portion judges that the confirmation by the authentication-information confirming portion with respect to the image data is necessary, the controller permits the selecting portion to select the one discharge tray, controls the recording device to record the image based on the image data after the authentication-information confirming portion has confirmed that the authentication information contains the specific information, and controls the discharge mechanism to discharge, to the one discharge tray selected by the selecting portion, the recording medium on which the image based on the image data has been recorded,
wherein, when the confirmation-necessity judging portion judges that the confirmation by the authentication-information confirming portion with respect to the image data is not necessary, the controller controls the recording device to record the image based on the image data on the recording medium and controls the discharge mechanism to discharge, to any one of the discharge trays, the recording medium on which the image based on the image data has been recorded, and wherein the controller permits the selecting portion to stand by without conducting selection of one of the discharge trays until the selection by the selecting portion becomes possible, where the selection by the selecting portion is impossible when the confirmation-necessity judging portion judges that the confirmation by the authentication-information confirming portion with respect to the image data is necessary.

2. The image recording apparatus according to claim 1, wherein the plurality of discharge trays include at least two discharge trays arranged in a vertical direction, and
wherein the selecting portion is configured not to select an uppermost one of the at least two discharge trays and to select, as the one discharge tray, any one of at least one discharge tray except the uppermost one of the at least two discharge trays.

3. The image recording apparatus according to claim 1, wherein the selecting portion is configured to cancel selection of the one discharge tray where one of the detectors corresponding to the one discharge tray detects absence of the recording medium discharged on the one discharge tray after the recording medium has been discharged to the selected one discharge tray, and
wherein the controller controls the discharge mechanism such that the recording medium on which an image based on image data transmitted from the exterior has been recorded is discharged to any one of the plurality of discharge trays except the one discharge tray selected by the selecting portion, where the confirmation-necessity judging portion makes a judgment that the confirmation by the authentication-information confirming portion with respect to the image data is not necessary before the selection of the one discharge tray is cancelled.

4. The image recording apparatus according to claim 1, wherein the selecting portion is configured to cancel selection of the one discharge tray when one of the detectors corresponding to the one discharge tray detects absence of the recording medium discharged on the one discharge tray after the recording medium has been discharged to the selected one discharge tray, and
wherein, when the confirmation necessity judgment portion judges that the confirmation by the authentication information confirming portion with respect to the image data is not necessary before the selection of the one discharge tray is canceled, the controller controls the recording portion not to perform the recording, on the recording medium, of an image based on image data transmitted from the exterior even if there exists any tray on which the recording medium is not placed.

5. The image recording apparatus according to claim 1, wherein the controller controls the recording device to stand by without performing the recording of the image based on the image data in a period during which the selecting portion stands by without conducting the selection.

6. The image recording apparatus according to claim 1, wherein the controller further includes a discharge confirming portion configured to inquire a user of a discharge of the recording medium to any one of the plurality of discharge trays, where the authentication information is inputted through the input device in a period during which the selecting portion stands by without conducting the selection.

7. The image recording apparatus according to claim 1,
wherein the controller is configured such that, when the confirmation-necessity judgment portion judges that the confirmation by the authentication-information confirming portion with respect to the image data is necessary, the image data is converted, subsequent to the judgment by the confirmation-necessity judgment portion, into drive data for driving the recording device and such that the drive data is transmitted to the recording device after completion of the confirmation by the authentication-information confirming portion.

8. The image recording device according to claim 1, further comprising a notifying device configured to notify a user of the one discharge tray selected by the selecting portion.

\* \* \* \* \*